United States Patent
Wu et al.

(10) Patent No.: US 8,320,117 B2
(45) Date of Patent: Nov. 27, 2012

(54) DRIVE MOUNTING ASSEMBLY AND COMPUTER CHASSIS USING THE SAME

(75) Inventors: Wei Wu, Shenzhen (CN); Xin Yang, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 271 days.

(21) Appl. No.: 12/912,752

(22) Filed: Oct. 27, 2010

(65) Prior Publication Data
US 2012/0087080 A1    Apr. 12, 2012

(30) Foreign Application Priority Data
Oct. 11, 2010   (CN) ............... 2010 1 0502731

(51) Int. Cl.
*H05K 5/00* (2006.01)
*H05K 7/00* (2006.01)
(52) U.S. Cl. ......... 361/679.33; 361/679.31; 361/679.32; 361/679.34; 361/679.35; 361/679.36; 361/679.37; 361/679.38
(58) Field of Classification Search ............ 361/679.31, 361/679.32, 679.33, 679.34, 679.35, 679.36, 361/679.37, 679.38, 679.39
See application file for complete search history.

(56) References Cited

U.S. PATENT DOCUMENTS

| | | | | |
|---|---|---|---|---|
| 5,513,069 A * | 4/1996 | Ohgami et al. | | 361/679.39 |
| 5,515,237 A * | 5/1996 | Ogami et al. | | 361/679.37 |
| 5,654,873 A * | 8/1997 | Smithson et al. | | 361/679.37 |
| 5,682,291 A * | 10/1997 | Jeffries et al. | | 361/679.58 |
| 5,765,933 A * | 6/1998 | Paul et al. | | 312/332.1 |
| 6,222,727 B1 * | 4/2001 | Wu | | 361/679.37 |
| 6,385,036 B1 * | 5/2002 | Chien | | 361/679.58 |
| 6,616,106 B1 * | 9/2003 | Dean et al. | | 248/27.1 |
| 6,836,406 B2 * | 12/2004 | Weng et al. | | 361/679.38 |
| 7,206,200 B2 * | 4/2007 | Chung | | 361/679.39 |
| 2002/0089821 A1 * | 7/2002 | Weng et al. | | 361/685 |
| 2009/0091884 A1 * | 4/2009 | Walker et al. | | 361/679.37 |

* cited by examiner

*Primary Examiner* — Anthony Haughton
(74) *Attorney, Agent, or Firm* — Altis Law Group, Inc.

(57) ABSTRACT

A drive mounting assembly applied in a computer chassis includes a main body, a protecting member, and a switch. The main body is configured to mount a drive. The protecting member includes a protecting plate exposed to the computer chassis to protect the drive from contamination. The switch is mounted on the main body and configured to generate signals to inform the drive to drive a tray of the drive out of and into the assembly. While driving the tray to extend from the assembly, the protecting plate is driven from a closed position to an open position to let the tray to extend from the assembly. When the tray is driven to retract into the assembly, the protecting plate is driven to the closed position to shield the drive. A related computer chassis is also provided.

12 Claims, 5 Drawing Sheets

DRIVE MOUNTING ASSEMBLY AND COMPUTER CHASSIS USING THE SAME

BACKGROUND

1. Technical Field

The present disclosure relates to drive mounting assemblies and computer chassis and, particularly, to a drive mounting assembly capable of protecting a drive from contamination and a computer chassis using the drive mounting assembly.

2. Description of Related Art

Computer chassis usually include drives, for example CD-ROM drives.

The drives of conventional computer chassis are partially exposed, thus the drives may be contaminated.

BRIEF DESCRIPTION OF THE DRAWINGS

The components of the drawings are not necessarily drawn to scale, the emphasis instead being placed upon clearly illustrating the principles of a drive mounting assembly and a computer chassis using the same. Moreover, in the drawings, like reference numerals designate corresponding parts throughout several views.

DETAILED DESCRIPTION

Figure 1:
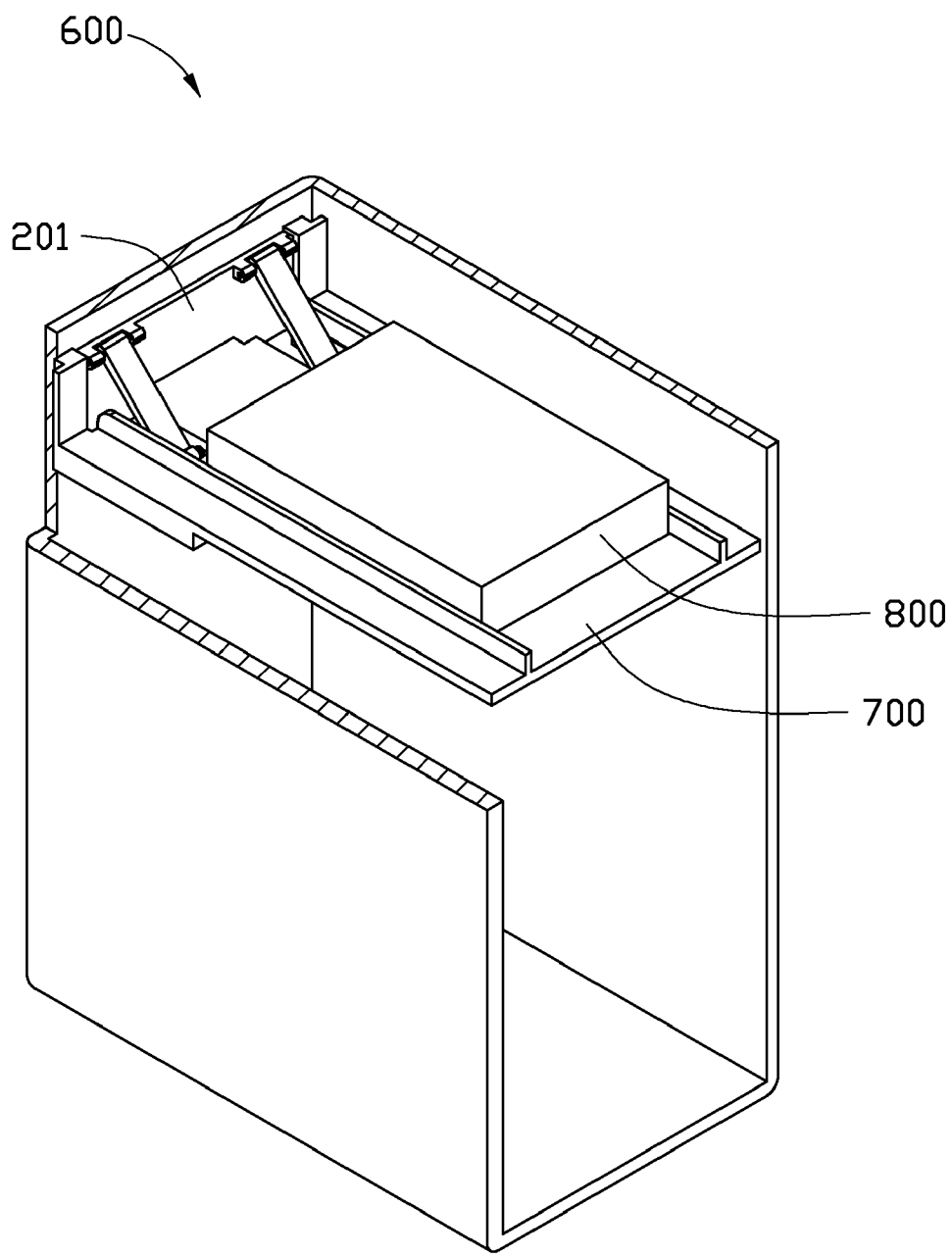
FIG. 1 is a cut-away view of a computer chassis in accordance with an exemplary embodiment, showing a drive mounting assembly and a drive.
Figure 2:
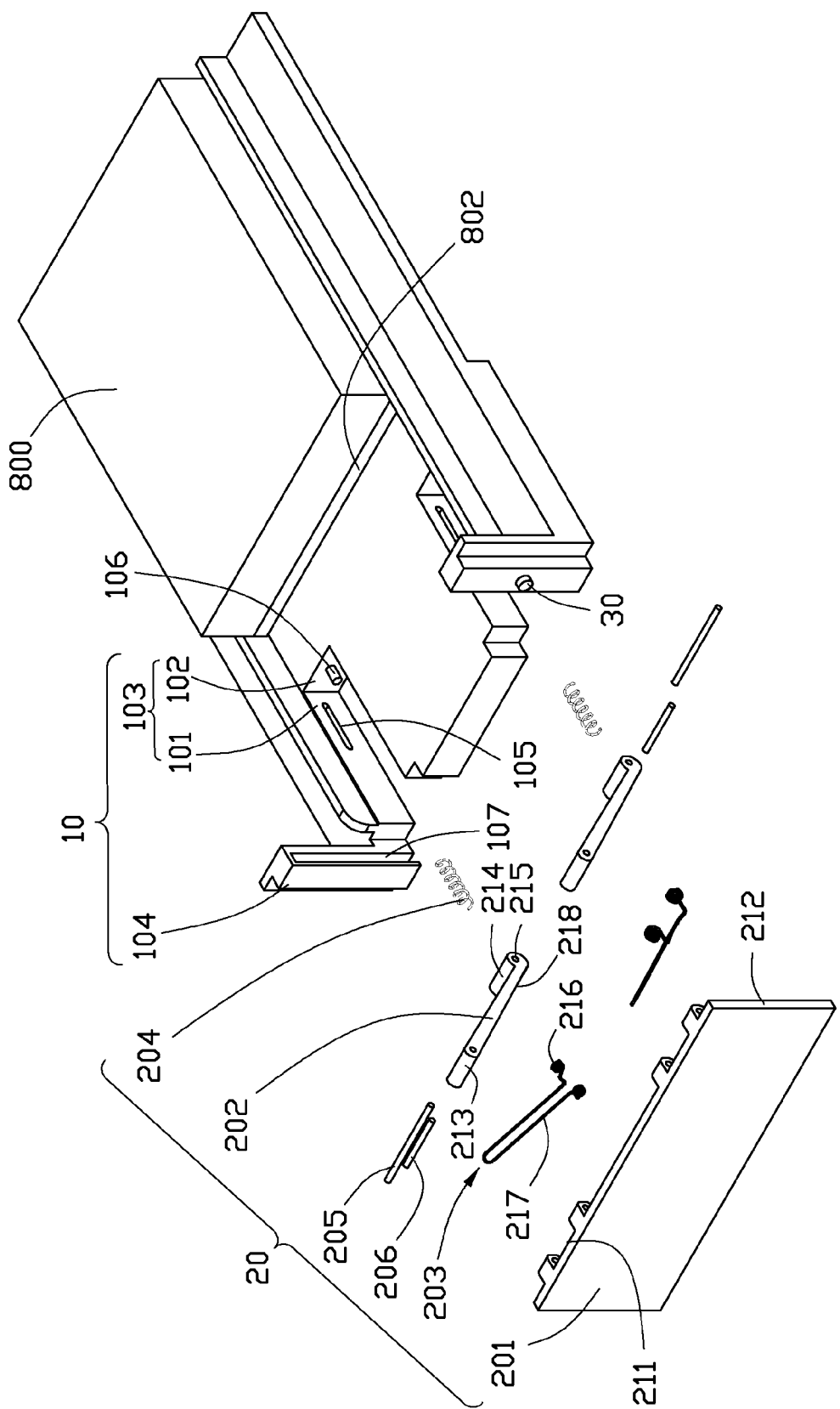
FIG. 2 is an exploded, perspective view of the drive mounting assembly of FIG. 1.

Referring to FIGS. 1-2, a computer chassis 600 includes a drive mounting assembly 700 therein to mount a drive 800. The assembly 700 includes a main body 10, a protecting member 20, and a switch 30. The main body 10 is configured to mount the drive 800. The protecting member 20 includes a protecting plate 201 exposed to the computer chassis 600 to protect the drive 800 from contamination. The switch 30 is mounted on the main body 10 and is exposed for users to operate. The switch 30 is configured to generate signals to inform the drive 800 to drive a tray 802 of the drive 800 to extend from and retract into the assembly 700 similar to any conventional drive. While driving the tray 802 out of the assembly 700, the protecting plate 201 is driven from a closed position to an open position to let the tray 802 out of the assembly 700. When the tray 802 is driven into the assembly 700, the protecting plate 201 is driven to the closed position to shield the drive 800.

The front end of the main body 10 includes two stopper portions 104 spaced by a distance to allow the tray 802 to move into and out of the assembly 700. The stopper portion 104 defines a first sliding groove 107 substantially perpendicular to the directions of movement of the tray 802. The switch 30 is mounted on one stopper portion 104.

The main body 10 defines at least one slot 103 extending from and open at the front end of the main body 10. In this embodiment, two slots 103 are deployed. The slots 103 are arranged between the stopper portions 104 and substantially parallel to each other. The slots 103 each includes two opposite first sidewalls 101 and a second sidewall 102 arranged between the first sidewalls 101 and opposite the open front end. Each first sidewall 101 defines a second sliding groove 105 substantially perpendicular to the first sliding groove 107. A projection 106 protrudes from the second sidewall 102.

The protecting member 20 includes the protecting plate 201, at least one connecting plate 202, at least one first elastic member 203, at least one second elastic members 204, at least one first shaft 205, and at least one second shaft 206. In this embodiment, two connecting plates 202, two first elastic members 203, two second elastic members 204, two first shafts 205, and two second shafts 206 are deployed.

The protecting plate 201 includes a top end 211 and two opposite surfaces 212. The surfaces 212 are respectively slidably received in the first sliding grooves 104.

The connecting plate 202 can be received in the slot 103. The connecting plate 202 includes a first end 213 and a second end 214 opposite to the first end 214. The first end 213 is pivotably connected to the top end 211 by the second shaft 206. The second end 214 is slidably connected to the slot 103 by the first shaft 205. Specifically, the second end 214 defines a shaft hole 215 to allow the first shaft 205 to pass through. The first shaft 205 passes through the shaft hole 215 with two opposite ends slidably received in the second sliding grooves 105.

The first elastic member 203 includes two connecting ends 216 and an elastic portion 217. The connecting ends 216 are respectively secured to the opposite ends of the first shaft 205. The elastic portion 217 resists the back surface 218 of the connecting plate 202. In this embodiment, the first elastic member 203 is a torsion spring and substantially U-shaped. The second elastic member 204 is arranged over the projection 106 with opposite ends respectively resisting the second sidewall 102 and the second end 214. In this embodiment, the second elastic member 204 is a coil spring.

Figure 3:
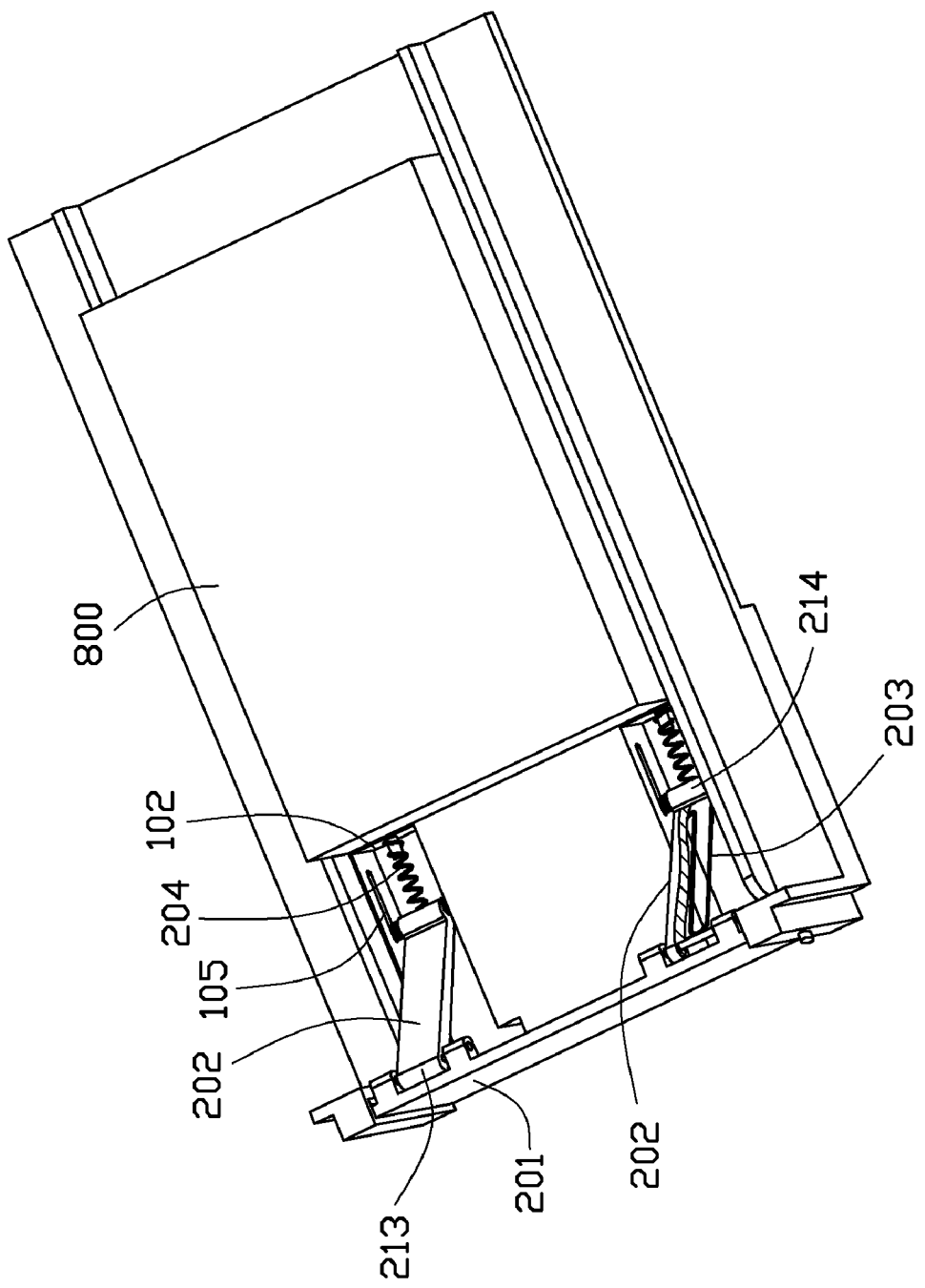
FIG. 3 is an isometric view of the drive mounting assembly and the drive of FIG. 1, showing the drive mounting assembly in a closed sate.

Referring to FIG. 3, initially, due to the first elastic member 203 and the second elastic member 204, the connecting plate 202 is in an original position where the second end 214 is far away from the second sidewall 102, and the protecting plate 201 is in the closed position where the surfaces 212 are fully received in the first sliding grooves 107. Therefore, the protecting plate 201 can protect the drive 800 from contamination.

Figure 4:
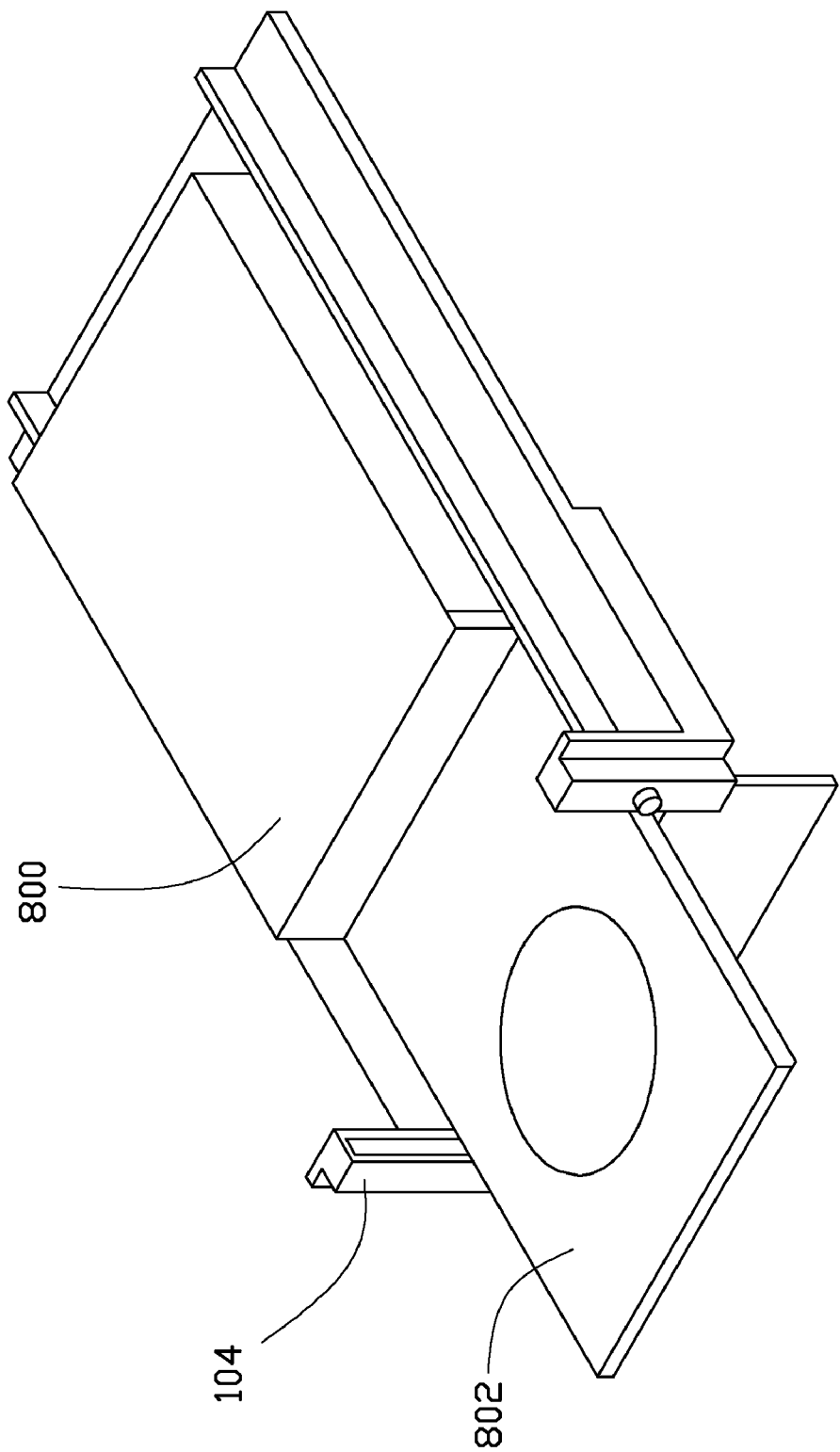
FIG. 4 is another isometric view of the drive mounting assembly and the drive of FIG. 1, showing the drive mounting assembly in an open state.
Figure 5:
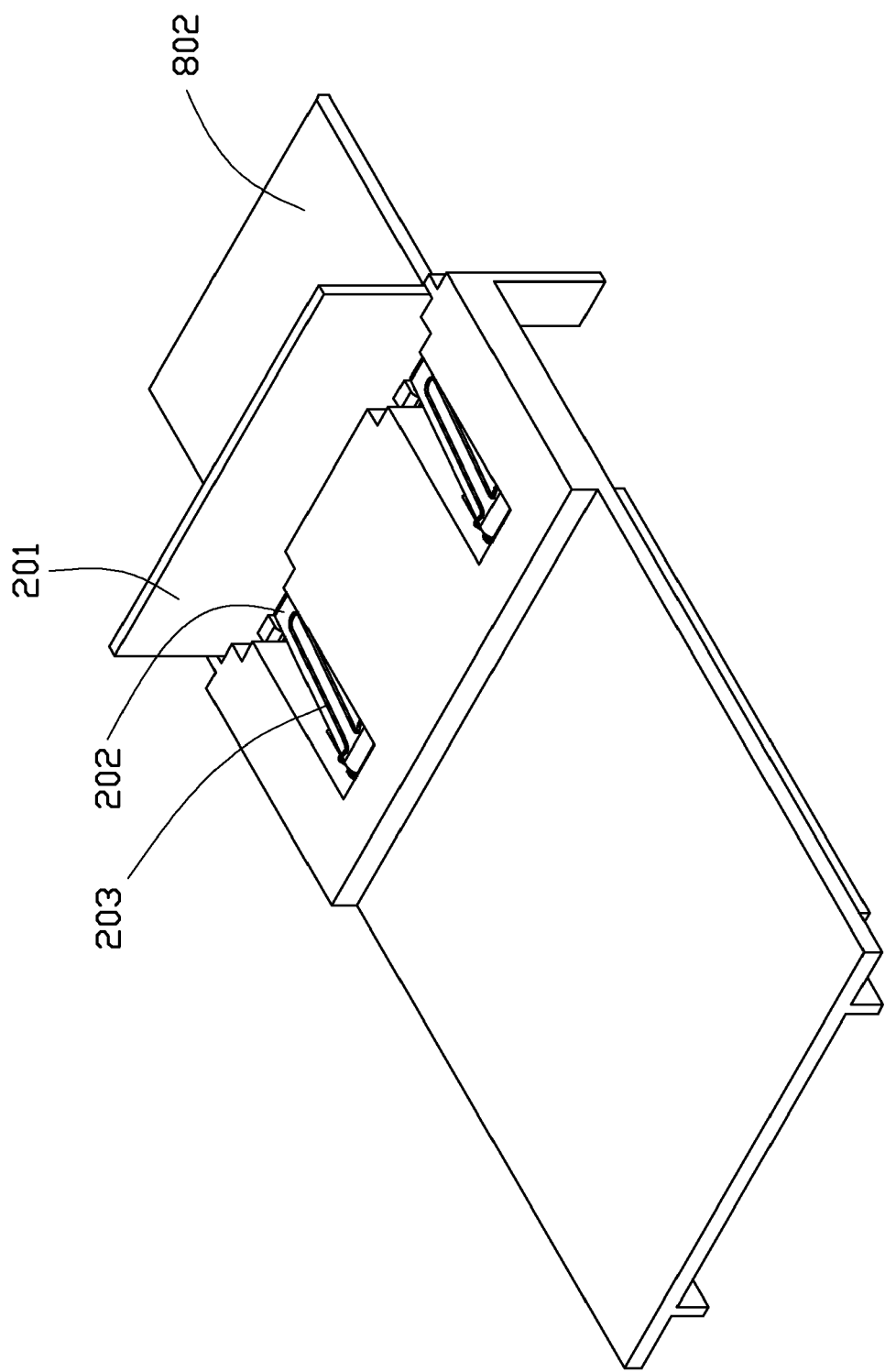
FIG. 5 is similar to FIG. 4, but viewed from another viewpoint.

Referring also to FIGS. 4-5, to drive the tray 802 out of the assembly 700, the switch 30 is activated. While driving the tray 802 out of the assembly 700, the tray 802 presses the connecting plate 202, causing the first end 213 to move downwardly and the second end 214 to slide toward the second sidewall 102. The movement of the connecting plate 202 drives the protecting plate 201 to move downwardly in the first sliding grooves 107 to the open position. The movement of the connecting plate 202 twists the first elastic member 203, and compresses the second elastic member 204. To drive the tray 802 into the assembly 700, the switch 30 is activated again. As the tray 802 is received in the assembly 700, the first elastic member 203 and the second elastic member 204 rebound and return the connecting plate 202 and the protecting plate 201 to their original state.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A drive mounting assembly applied in a computer chassis, the drive mounting assembly comprising:
   a main body configured to mount a drive, the main body comprising two stopper portions and at least one slot arranged between the stopper portions, the stopper portions protruding from an end of the main body and being spaced by a distance to allow a tray of the drive to pass through;
   a protecting member comprising:
      a protecting plate slidably connected to the stopper portions and movable between a closed position and an open position;
      at least one shaft;
      at least one connecting plate, each of the at least one connecting plate comprising a first end pivotally connected to a top end of the protecting plate and a second end slidably connected to one of the at least one slot through one of the at least one shaft;
      at least one first elastic member each comprising two connecting ends and an elastic portion, the connecting ends of each of the at least one first elastic member being respectively secured to opposite ends of one of the at least one shaft, the elastic portion of each of the at least one first elastic member resisting a back surface of one of the at least one connecting plate; and
      at least one second elastic member, opposite ends of each of the at least one elastic member respectively resisting the second end of one of the at least one connecting member and the main body; and
   a switch mounted on the main body and configured to generate signals to inform the drive to drive the tray to extend from and retract into the drive mounting assembly;
   wherein, the at least one connecting plate, the at least one first elastic member, and the at least one second elastic member cause the protecting plate to be in the closed position, while driving the tray to extend from the drive mounting assembly, the tray presses the at least one connecting member to drive the protecting plate to the open position.

2. The drive mounting assembly as described in claim 1, wherein each of the stopper portions defines a first sliding groove substantially perpendicular to directions of movement of the tray, opposite surfaces of the protecting plate are respectively slidably received in the first sliding grooves.

3. The drive mounting assembly as described in claim 1, wherein each of the at least one slot comprises two opposite first sidewalls and a second sidewall arranged between the first sidewalls and away from the stopper portions, each of the first sidewalls defines a second sliding groove substantially parallel to directions of movement of the tray, opposite ends of each of the at least one shaft are respectively slidably received in the second sliding grooves.

4. The drive mounting assembly as described in claim 3, wherein the opposite ends of each of the at least one second elastic member respectively resist the second end of one of the at least one connecting plate and the second sidewall of one of the at least one slot.

5. The drive mounting assembly as described in claim 1, wherein the at least one first elastic member is a torsion spring.

6. The drive mounting assembly as described in claim 1, wherein the at least one first elastic member is U-shaped.

7. A computer chassis comprising:
   a main body configured to mount a drive, the main body comprising two stopper portions and at least one slot arranged between the stopper portions, the stopper portions protruding from an end of the main body and being spaced by a distance to allow a tray of the drive to pass through;
   a protecting member comprising:
      a protecting plate slidably connected to the stopper portions and movable between a closed position and an open position;
      at least one shaft;
      at least one connecting plate, each of the at least one connecting plate comprising a first end pivotally connected to a top end of the protecting plate and a second end slidably connected to one of the at least one slot through one of the at least one shaft;
      at least one first elastic member comprising two connecting ends and an elastic portion, the connecting ends of each of the at least one first elastic member being respectively secured to opposite ends of one of the at least one shaft, the elastic portion of each of the at least one first elastic member resisting a back surface of one of the at least one connecting plate; and
      at least one second elastic member, opposite ends of each of the at least one elastic member respectively resisting the second end of one of the at least one connecting member and the main body; and
   a switch mounted on the main body and configured to generate signals to inform the drive to drive the tray to extend from and retract into the drive mounting assembly;
   wherein, the at least one connecting plate, the at least one first elastic member, and the at least one second elastic member cause the protecting plate to be in the closed position, while driving the tray to extend from the drive mounting assembly, the tray presses the at least one connecting member to drive the protecting plate to the open position.

8. The computer chassis as described in claim 7, wherein each of the stopper portions defines a first sliding groove substantially perpendicular to directions of movement of the tray, opposite surfaces of the protecting plate are respectively slidably received in the first sliding grooves.

9. The computer chassis as described in claim 7, wherein each of the at least one slot comprises two opposite first sidewalls and a second sidewall arranged between the first sidewalls and away from the stopper portions, each of the first sidewalls defines a second sliding groove substantially parallel to directions of movement of the tray, opposite ends of each of the at least one shaft are respectively received in the second sliding grooves.

10. The computer chassis as described in claim 9, wherein the opposite ends of each of the at least one second elastic member respectively resist the second end of one of the at least one connecting plate and the second sidewall of one of the at least one slot.

11. The computer chassis as described in claim 7, wherein the at least one first elastic member is a torsion spring.

12. The computer chassis as described in claim 7, wherein the at least one first elastic member is U-shaped.

* * * * *